United States Patent [19]
Curry et al.

[11] Patent Number: 5,138,339
[45] Date of Patent: Aug. 11, 1992

[54] MICROADDRESSABILITY VIA OVERSCANNED ILLUMINATION FOR OPTICAL PRINTERS AND THE LIKE HAVING HIGH GAMMA PHOTOSENSITIVE RECORDING MEDIA

[75] Inventors: Douglas N. Curry, Menlo Park; David L. Hecht, Palo Alto, both of Calif.

[73] Assignee: Xerox Corporation, Stamford, Conn.

[21] Appl. No.: 736,989

[22] Filed: Jul. 29, 1991

[51] Int. Cl.$^5$ ............................................... H04N 1/21
[52] U.S. Cl. ..................................... 346/108; 358/296
[58] Field of Search ................. 346/108, 107 R, 76 L, 346/160, 110 R; 358/296, 300, 302

[56] References Cited

U.S. PATENT DOCUMENTS 4,912,568 3/1990 Shimano ............................... 358/298
4,965,599 10/1990 Roddy et al. ......................... 346/160

Primary Examiner—Mark J. Reinhart

[57] ABSTRACT

Microaddressable printers and other types of display systems are provided for rendering two dimensional images on high gamma, photosensitive recording media. These systems are microaddressable because they are operated in an overscanned mode to render images by scanning one or more intensity modulated scan spots over a high gamma, photosensitive recording medium in accordance with a scan pattern that causes the spot or spots to superimpose multiple discrete exposures on the recording medium on centers that are separated by a pitch distance that is significantly less than the effective spatial diameter of the scan spot or spots (e.g., the full width/half max. diameter of a gaussian scan spot). Overscanned systems have substantially linear addressability responses, so boundary scans that are intensity modulated in accordance with preselected offset values are used by these systems for spatially positioning the transitions that are contained by the images they render to a sub-pitch precision.

13 Claims, 9 Drawing Sheets

MICROADDRESSABILITY VIA OVERSCANNED ILLUMINATION FOR OPTICAL PRINTERS AND THE LIKE HAVING HIGH GAMMA PHOTOSENSITIVE RECORDING MEDIA

FIELD OF THE INVENTION

This invention relates to optical display systems having high gamma, photosensitive recording media and, more particularly, to relatively inexpensive and easily implemented methods and means for increasing the precision with which these display systems spatially position edges and other types of transitions in the images they display. Even more specifically, this invention pertains to economical and technically attractive methods and means for increasing the precision with which optical printers that utilize high gamma recording media, such a xerographic printers, spatially position transitions in the images they print.

BACKGROUND OF THE INVENTION

Many of the commercially available laser printers, as well as some of the recently introduced electronic copiers, include flying spot raster output scanners (ROS's) for printing latent electrostatic images on xerographic photoreceptors. These photoreceptors generally have steeply sloped contrast vs. exposure characteristics (high gamma), together with well defined exposure thresholds (called the "xerographic threshold"), so they characteristically yield high contrast, bitmapped images (e.g., black and white). Some xerographic printers operate in a "write black" mode to optically expose the image foreground for printing by means of an "exposed area development" process, while others operate in a "write white" mode to expose the image background for printing by means of a "charged area development" process.

As is known, both write black and write white xerography are suitable for color printing. So-called "full color" xerographic prints customarily are composed by printing three or four different color separation (e.g., cyan, magenta and yellow for three color printing, and cyan, magenta, yellow and black for four color printing) in superimposed registration on a suitable substrate, such as plain paper. Highlight color prints, on the other hand, can be produced by printing as few as two color separations (e.g., black and a selected highlight color). There is however, a common thread because each of these colors separations generally is a high contrast image. It, therefore, will be evident that the fundamental operating principles and functional advantages of this invention apply to both monotone and color xerography.

Many of the ROS's that have been developed for xerographic printing employ a single beam or a multi-beam laser light source for supplying one or more intensity modulated light beams, together with a scanner (such as a polygon scanner) for cyclically deflecting the modulated laser beam or beams across a photoreceptor in a "fast scan direction" while the photoreceptor is being advanced simultaneously in an orthogonal, "process direction." In practice, each of the laser beams typically is brought to focus on or near the photoreceptor surface to provide a substantially focused "scan spot." The scan spot or spots, in turn, scan the photoreceptor in accordance with a predetermined scan pattern because the fast scan deflection of the laser beam or beams vectorially sums with the process direction motion of the photoreceptor. Indeed, the scan pattern is dependent upon and is determined by the scan rate (scan/sec.) of the scanner, the number of scan spots that are employed, and the process speed (inches/sec.) of the photoreceptor. Such a scan pattern produce an exposure pattern because the scans are superpositioned on the photoreceptor, regardless of whether the scans simultaneously or sequentially expose the photoreceptor. Accordingly, it is to be understood that the present invention applies to printers and other display that employ single beam or multi-beam ROS's, even though this disclosure features the single beam/single scan spot case for the sake of simplification.

Laser illuminated flying spot ROS's ordinarily are designed to provide generally circular or elliptical scan spots. To a first approximation, such a scan spot is characterized by having a gaussian intensity profile (as is known, this may be a very rough approximmantion if the scan spot is truncated). Prior laser printers generally have employed scan patterns that are selected to have a scan pitch (i.e., the center-to-center displacement, in the process direction, between spatially adjacent scan lines) that is comparable to the diameter of the scan spot as determined at an intensity level that is equal to one-half of its maximum or peak intensity. This sometimes is referred to as the full width, half max. ("FWHM") diameter of the scan spot.

Images often contain many transitions. For instance, black and white and other dual tone images have transition at the boundaries between their foreground features and their backgrounds, such as the transitions that demark line edges, font contours, and halftone dot patterns. Color images commonly include still additional transitions at the boundaries between differently colored foreground features. Consequently, the perceived quality of monotone and color prints tends to be strongly dependent upon the precision with which the printing process spatially positions these transitions.

Modern laser xerographic printers typically are designed to print at spatial resolutions ranging from about 300 dots/inch ("d.p.i") to about 600 d.p.i. As a practical matter, the image transition positioning precision of these printers can be increased to an extent by increasing their spatial resolution. but the frequency responses of the photoreceptor/developer combinations that currently are available for xerographic printing usually impose an upper limit on the resolution that can be achieved. Moreover, even when increased resolution is technically feasible, the additional resolution imposes further and potentially burdensome requirements on the optical and electrical design requirements of these printers, so there usually is a cost/performance tradeoff to be considered. Specifically, the cost of xerographic print engines tends to escalate as their spatial resolution is increased because of the additional memory and bandwidth these printers require for faithfully rendering higher resolution bitmap images without sacrificing throughput.

In apparent recognition of these technical challenges, others have proposed template matching techniques for more precisely controlling the size, positioning and number of picture elements ("pixels") that are printed on xerographic photoreceptors to render bitmapped images. For example, template matching has been developed for reducing the severity of certain printing artifacts, such as the observable stairstep-like scan structure (commonly referred to as "jaggies") that sometimes degrades the xerographically printed appearance of non-vertical and non-horizontal lines. See Tung U.S. Pat. No. 4,847,641, which issued Jul. 11, 1989 on "Piecewise Print Image Enhancement for Dot Matrix Printers" and Walsh et al U.S. Pat. No. 4,437,122, which issued Mar. 13, 1984 on "Low Resolution Raster Images." Template matching effectively overcomes some of the sampling errors that are caused by the use of input data that is too coarse to accurately represent the higher spatial frequency content of the image. It does not, however, solve the control problems that are encountered in existing printers because of the significant non-linearity of the way in which the spatial positioning and profiles of the transitions in the images they print tracks changes in the intensity of the transitional boundary scans. This "addressability response" issue is discussed in greater detail hereinbelow.

It, therefore, willbe evident that there still is a need for simplified methods and means for enabling optical printers and other display systems that render bit-mapped images on high gamma, photosensitive recording media, such as xerographic laser printers, to spatially position transitions within the images they render with a sub-resolution spatial precision (i. e., a precision that is greater than the spatial resolution of the system). More particularly, relatively inexpensive and easily implemented methods and means are needed for enabling laser ROS-type printers to spatially position transitions in the images they print to a precision, in the process direction, that is a sub-multiple of the scan pitch.

SUMMARY OF THE INVENTION

In response to the above-described need, the present invention provides microadrressable display systems for rendering tow dimensional images on high gamma, photsensitive recording media. These systems are microaddressable because they operate in an overscanned mode to render images by scanning one or more intensity modulated scan spots over a recording medium of the foregoing type in accordance with a scan pattern that causes the scan spot or spots to superimpose multiple discrete exposures on the recording medium on generally uniformly spaced centers that are separated from each other by a pitch distance that is significantly less than the effective spatial diameter of the scan spot or spots (e. g., the full width/half max. diameter of a gaussian scan spot). Overscanned systems have substantially linear addressability responses, so boundary scans that are intensity modulated in accordance with preselected offset values are used in these systems for controlling the spatial positions at which image transitions are rendered to a sub-pitch precision.

BRIEF DESCRIPTION OF THE DRAWINGS

Additional features and advantages of this invention will become apparent when the following detailed description is read in conjunction with the attached drawings, in which.

DETAILED DESCRIPTION

While the invention is described in some detail hereinbelow with specific reference to certain embodiments, it is to be understood that there is no intent to limit it to those embodiments. On the contrary, the aim is to cover all modifications, alternatives and equivalents falling within the spirit and scope of the invention as defined by the appended claims.

Figure 1:
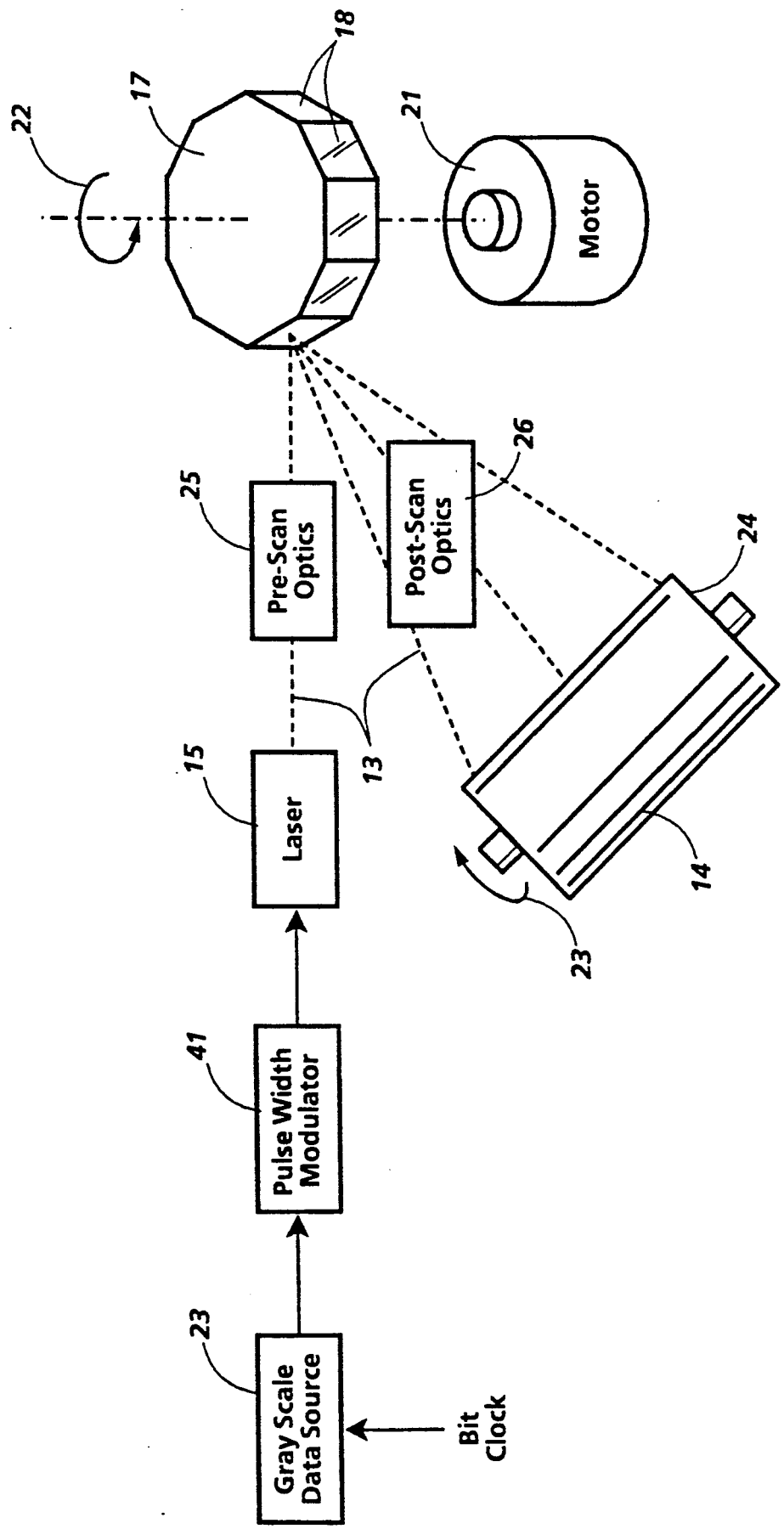
FIG. 1 is a simplified schematic diagram of a xerographic printer that is equipped to carry out the present invention.

Turning now to the drawings, and at this point especially to FIG. 1, there is a xerographic print engine 11 (shown only in relevant part) having a more or less conventionally configured flying spot ROS 12 for scanning a data modulated light beam 13 over a xerographic photoreceptor 14 in accordance with a predetermined raster scanning pattern. To that end, the ROS 12 comprises a laser diode 15 for emitting the light beam 13 in the visible or invisible (e.g., infra-red) band of the spectrum, together with a polygon scanner 17 that has a plurality of nearly identical, mirror-like exterior sidewalls or "facets" 18.

In keeping with standard practices, there is a motor 21 for rotating the scanner 17 about its central axis, as indicated by the arrow 22, at a substantially constant angular velocity. The scanner 17 is optically aligned between the laser 15 and the photoreceptor 14, so its rotation causes the laser beam 13 to be intercepted by and reflected from one after another of the scanner facets 18, with the result tha the beam 13 is cyclically swept across the photoreceptor 14 in a fast scan direction. The photoreceptor 14, on the other hand, is advanced (by means not shown) simultaneously in an orthogonal, process direction at a substantially constant linear velocity, as indicated by the arrow 23, so the laser beam 13 scans the photoreceptor 14 in accordance with a raster scan pattern. As shown, the photoreceptor 14 is coated on a rotating drum 24, but it will be apparent that it also could be carried by a belt or any other suitable substrate.

Typically, the ROS 12 additionalyy includes pre-scan optics 25 and post-scan optics 26 for bringing the laser beam 13 to a generally circular focus proximate teh photoreceptor 14 and for providing any optical correction that may be needed to compensate for scanner wobble and other optical irregularities. Preferably, the optical aperture of the ROS 12 si sufficiently large to avoid excessive truncation of the laser beam 13 because the beam 13 then comes to a generally circular or elliptical focus with a gaussian intensity profile. However, the broader aspects of this invention are not limited to any specific scan spot geometry or intensity profile. Accpeted design principles indicate that the spatial frequency power spectrum of the scan spot profile should not have significant spatial frequency components outside the spatial frequency passhand of the imaging system, but the scan spot can otherwise be tailored to satisfy a variety of system requirements.

To carry out the present invention, the amplitude, duty cycle, and/or pulse width of the laser beam 13 is serially modulated (collectively referred to herein as its "intensity modulation") in accordance with successive multi-bit digital data values. These data values are clocked out of a buffered data source 23 serially in response to data clock pulses which are time synchronized with the scan of the scan spot from bitmap location-to-bitmap location within the raster scan pattern. Thus, the data clock frequency can be selected (by means not shown) to map the data onto the raster scan pattern at any desired magnification, using either the same or different magnifications in the fast scan and the process directions. As will be appreciated, the data may be preprocessed (by means not shown) for the printing of halftoned images and/or text and other types of line art, so the data source 23 generically represents any suitable source of gray scale date) for intensity modulating the laser beam 13.

As is known, the fast scan pixel positioning precision of the print engine 11 can be enhanced, if desired, by dynamically adjusting the frequency of the data clock to compensate for the pixel positioning errors that tend to be caused by "motor hunt" (i.e., variations in the angular velocity of the scanner 17), "polygon signature" characteristics (variations in the angular velocities at which the different facets 18 of the scanner 17 sweep the scan spot across the photoreceptor 14 from a start of scan position to an end of scan position), and "scan non-linearities" (i.e., localized variations in the linear velocity of the fast scan, which are caused by variances in the geometrilc relationship of the scannner 17 to spatially distinct segments of any given scan line). For more information on these sources of potential pixel positioning errors and the compensation that can be provided for those errors, the following commonly assigned U.S. patents are hereby incorporated by reference: D. N. Curry U.S. Pat. No. 4,622,593 which issued Nov. 11, 1986 on "Polygon Signature Correction", D. N. Curry U.S. Pat. No. 4,639,789 which issued Jan. 27, 1987 on "Raster Scanner Variable-Frequency Clock Circuit"; D. N. Curry et al. U.S. Pat. No. 4,766,560 which issued Aug. 23, 1988 on "Parallel/Pipelined Arithmetic Variable Clock Frequenty Synthesizer"; D. N. Curry U.S. Pat. No. 4,860,237 which issued Aug. 22, 1989 on "Scan Linearity Correction"; D. N. Curry U.S. Pat. No. 4,893,136 which issued Jan. 9, 1990 on "Arithmetically Computed Motor Hunt Compensation for Flying Spot Scanners"; and D. N. Curry U.S. Pat. No. 4,935,891 which issued Jan. 19, 1990 on "Pseudo-Random Phase Shifted Arithmetic Bit Clock Generators for Digital Printers." It is to be understood, however, that the increased pixel positioning precision that these existing compensation techniques provide strictly pertains to the spatial positioning of the pixel centers in the fast scan direction. This differs from the two dimensional "high addressability" or "microaddressability" that this invention provides because microaddressability enables image transitions to be spatially positioned with sub-resolution precision in both the process direction and the fast scan direction. This feature sometimes is referred to as "two dimensional high addressability" or, in abbreviated form, as "2D high addressability."

More particularly, in accordance with the present invention, the pitch of the scan pattern for the printer 11 is selected to be significantly finer (i.e., smaller) than the FWHM diameter of the scan spot that is formed from the scan beam 13. This relatively fine pitch scan pattern causes the printer 11 to operate in an "overscanned" mode because the FWHM central core of the scan spot sweeps across spatially overlapping segments of the photoreceptor 14 during the scanning of spatially adjacent (i.e., neighboring) scan lines. Overscanning slightly degrades the spatial frequency response of the printer 11 in the process direction. However, it has been found the linearity of the addressability response of ROS printers, such as the printer 11, increases rapidly as the ratio of the scan pitch to the FWHM diameter of the scan spot is reduced to progressively smaller, sub-unity values (i.e., increasing the overscan). In other words, it has been found that overscanning is the key to providing the essentially linear position control that enables discrete exposures to map image transitions onto a scan pattern at a sub-resolution precision. Thus, in the printer shown in FIG. 1, a relatively small loss of process direction frequency response is accepted to achieve substantially increased process direction addressability. As will be seen, the use of an overscan factor (i.e., the ratio of the FWHM diameter of the scan spot to the scan pitch) in excess of about 2×–4× only marginally improves the linearity of the addressability response of the printer 11, so designers contemplating the use of overscan factors greater than 2× or so should carefully analyze the overall performance of the system that is being designed to ensure that it is satisfactory.

Figure 2A:
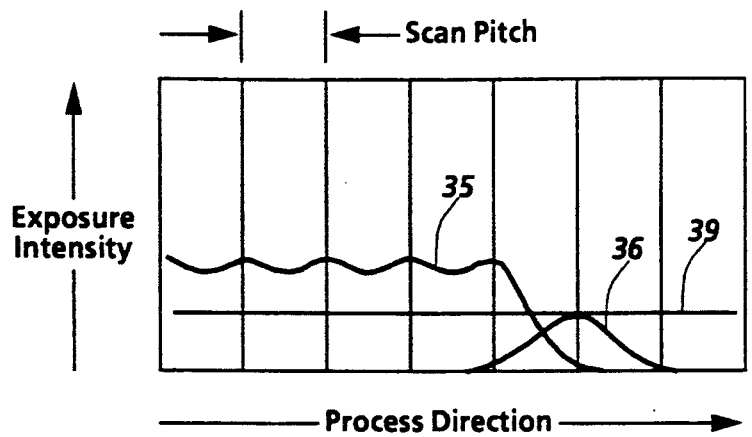
FIG. 2A illustrates the affect of a partial intensity boundary scan on the process direction impulse response of a printer of the type shown in FIG. 1 when the ROS scans the photoreceptor in accordance with a scan pattern having a scan pitch approximately equal to the FWHM diameter of the scan spot.
Figure 2B:
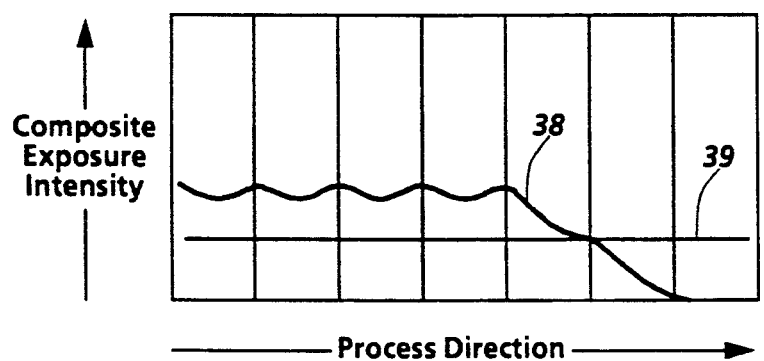
FIG. 2B illustrates the composite exposure profile that defines the process direction impulse response of a printer of the type shown in FIG. 1 when the printer is operated in accordance with FIG. 2A.
Figure 2C:
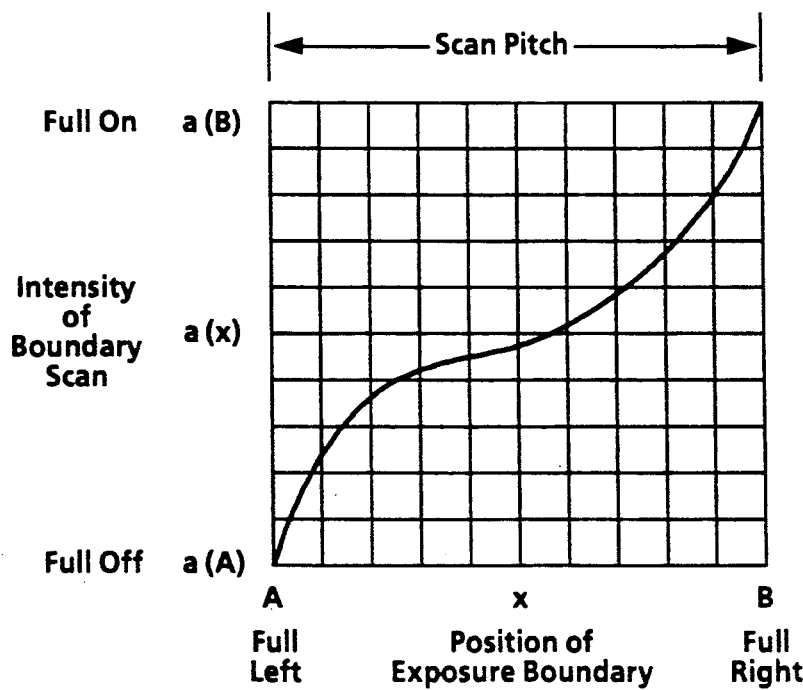
FIG. 2C is an addressability response curve (boundary scan intensity vs. exposure boundary displacement) for a printer of the type shown in FIG. 1 when the printer uses a scan pattern that has a scan pitch approximately equal to the FWHM diameter of the scan spot.

More particularly, FIGS. 2A–2B illustrate the exposure of a typical zerographic photoreceptor, such as the photoreceptor 14 (FIG. 1), to a step function that is oriented in the process direction, when the printing is performed by scanning a generally circular scan spot having a gaussian intensity profile over the photoreceptor in accordance with a scan pattern having a pitch approximately equal to the FWHM diameter of the scan spot. The step function is a typical image transition, which is defined by (a) a series of full intensity scans (the exposure caused by them is shown in FIG. 2A at 35), followed by (b) a single intensity modulated transitional or "boundary" scan as at 36 in FIG. 2A, and then by (c) a series of full-off or zero intensity scans. FIG. 2B demonstrates that the superpositioning of the discrete exposures that result from such a sequence of scans causes the exposures to additively combine, thereby producing a composite exposure profile 38 that crosses the xerographic threshold 39 of the photoreceptor 14 at a position which spatially varies as a function of the intensity of the boundary scan 36 (for illustrative purposes, the xerographic threshold 39 is depicted as being at about one half the peak level of the composite exposure profile 38). FIG. 2C, in turn, shows that there is a non-linearity of about ±15% in the relationship between the intensity of the boundary scan 36 and the spatial positioning of the point at which the exposure profile 38 crosses the xerographic threshold 39 (i.e., the spatial position of the image transition).

Figure 3A:
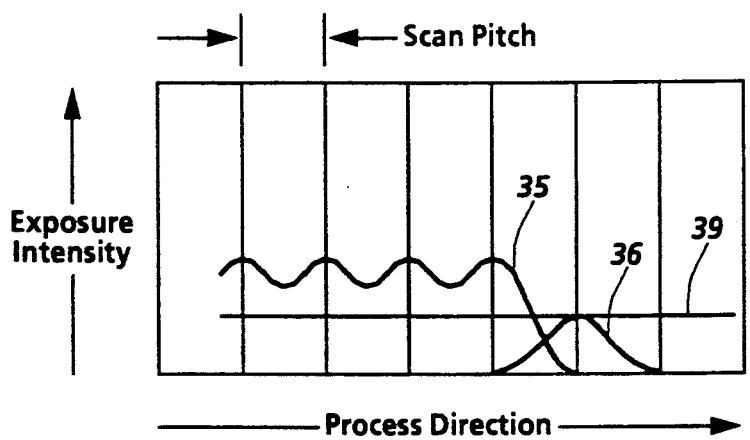
FIGS. 3A-3C are similar to FIGS. 2A-2C, respectively, except that the scan pattern upon which they are based has a pitch that is approximately equal to 1.25 times the FWHM diameter of the scan spot.
Figure 3B:
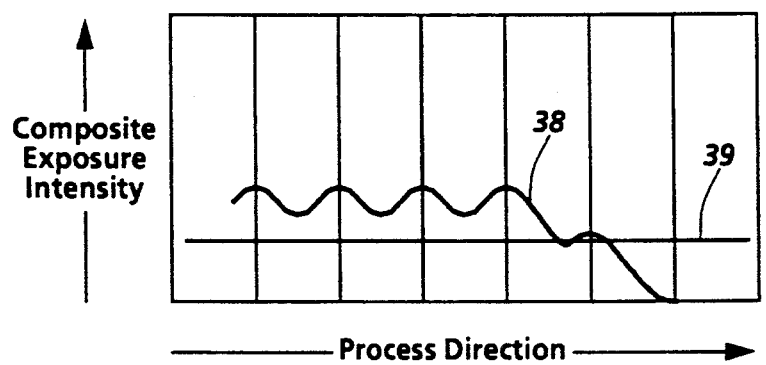
Figure 3C:
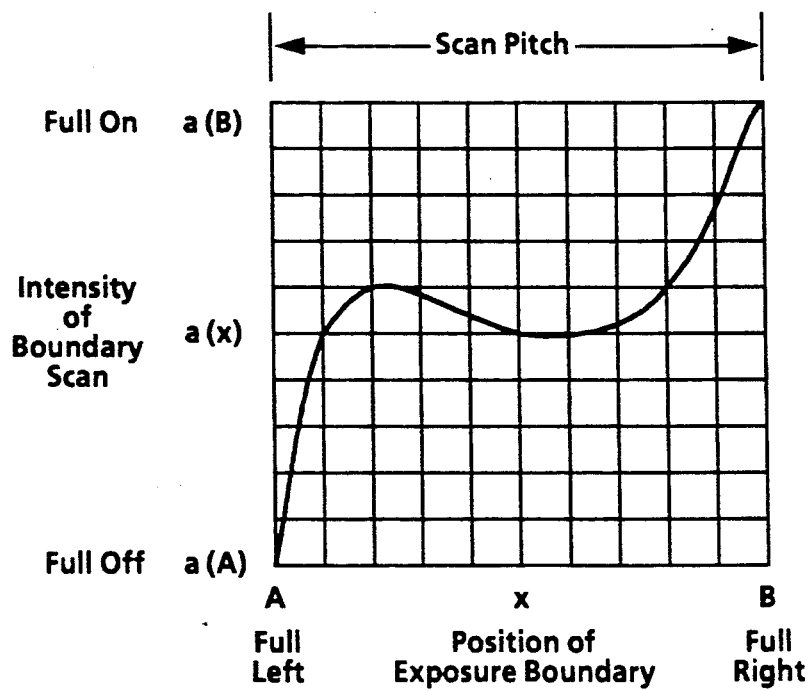
Figure 4A:
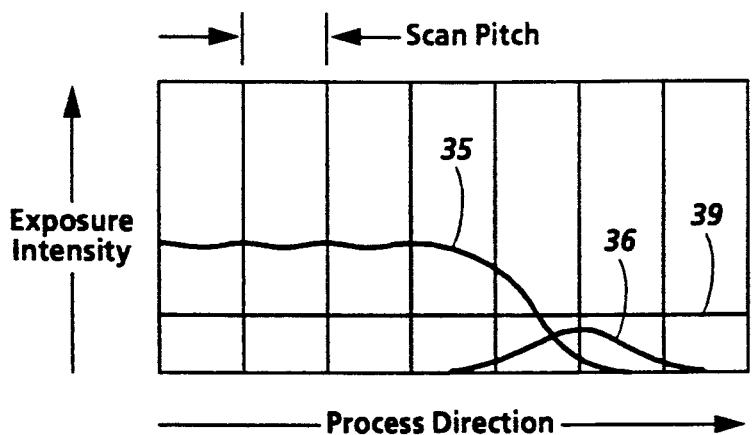
FIGS. 4A-4C also are similar to FIGS. 2A-2C, respectively, except that the scan pattern upon which they are based has a pitch that is approximately equal to 0.75 times the FWHM diameter of the scan spot.
Figure 4B:
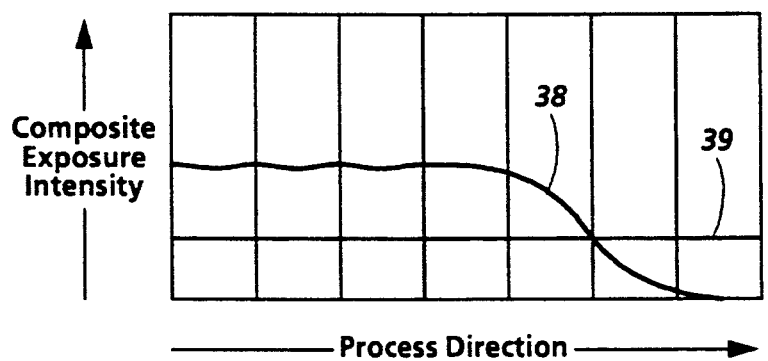
Figure 4C:
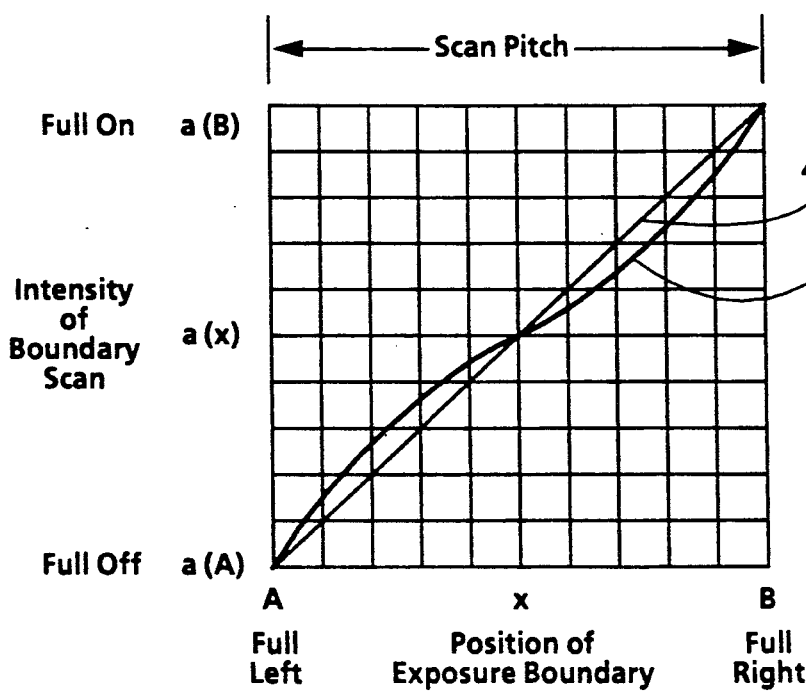
Figure 5A:
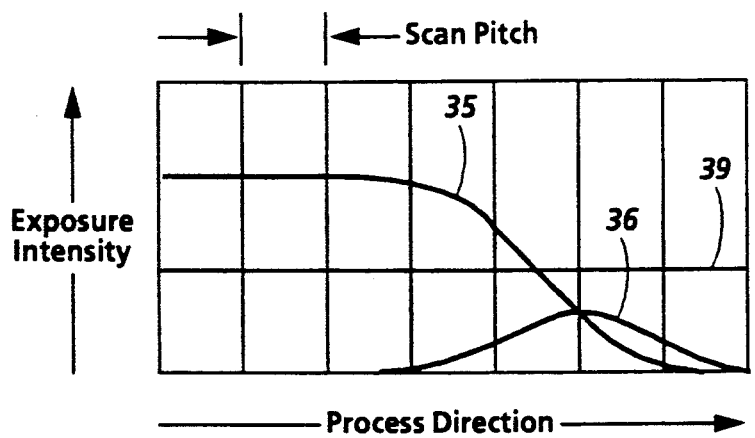
FIGS. 5A-5C again are similar to FIGS. 2A-2C, respectively, except that the scan pattern upon which they are based has a pitch that is approximately equal to 0.50 times the FWHM diameter of the scan spot.
Figure 5B:
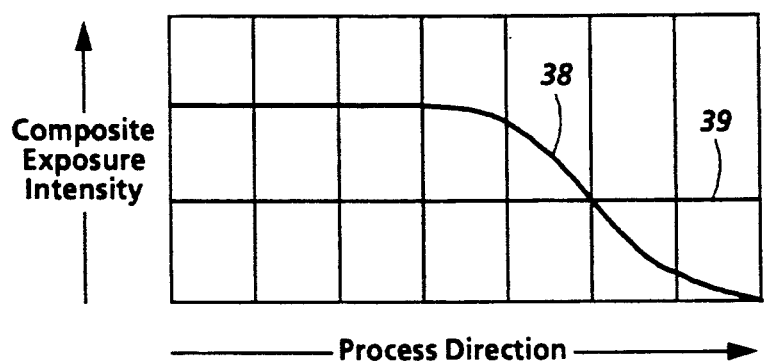
Figure 5C:
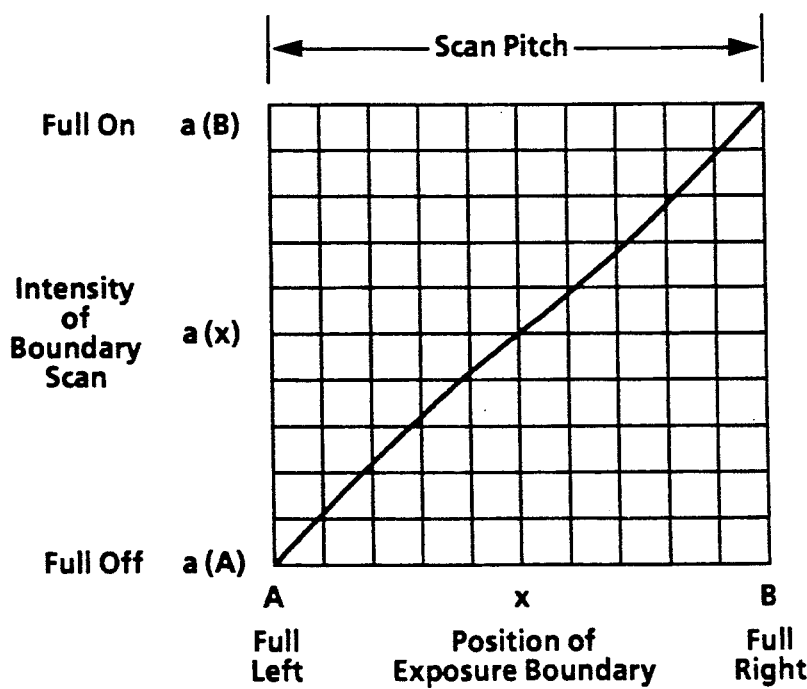

FIGS. 3A-3C provide the same analysis as FIGS. 2A-2C, respectively, for a case in which the scan pitch is selected to be approximately 1.25 times the FWHM diameter of the scan spot. FIG. 3C indicates that the non-linearity in the relationship between the intensity of the boundary scan 36 (FIG. 3A) and the spatial positioning of the point at which the exposure profile 38 (FIG. 3B) crosses the xerographic threshold 39 is non-monotonic. Thus, it will be evident that such a relatively coarse scan pitch is unattractive when the goal is to provide increased control over the spatial positioning of the image transitions.

Figure 6A:
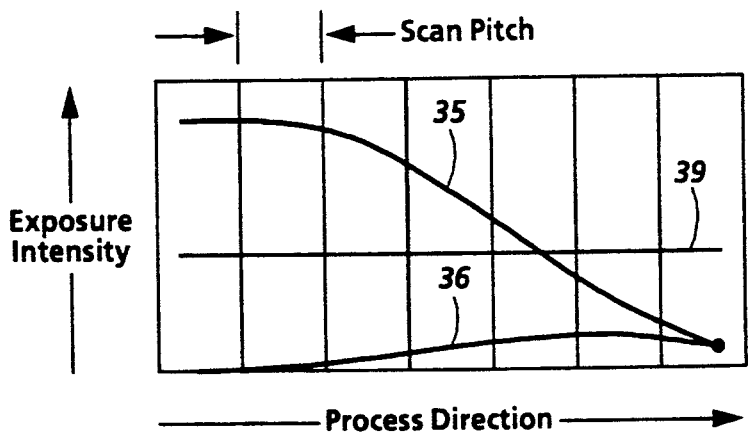
FIGS. 6A-6C once again are similar to FIGS. 2A-2C, respectively, except that the scan pattern upon which they are based has a pitch that is approximately equal to 0.25 times the FWHM diameter of the scan spot.
Figure 6B:
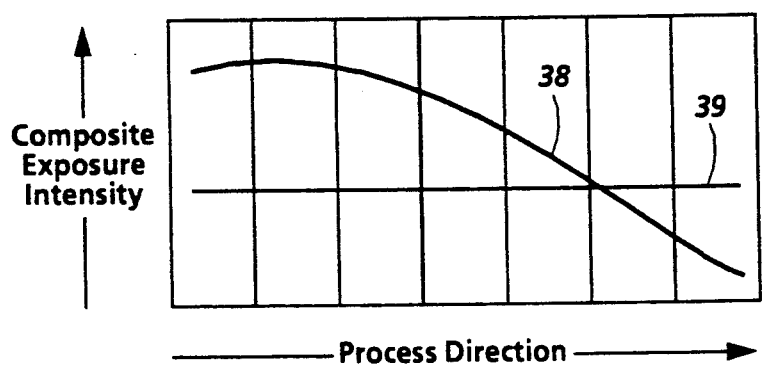
Figure 6C:
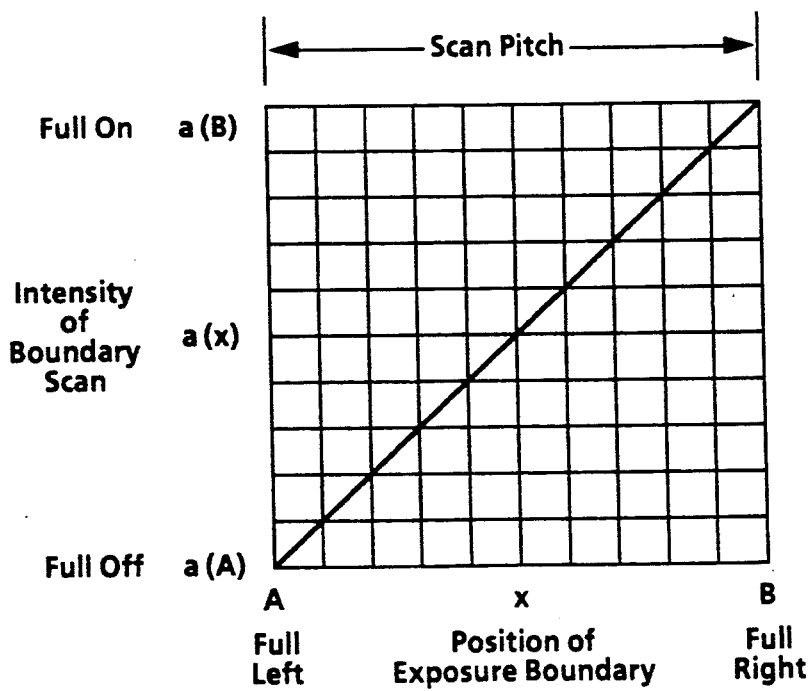

FIGS. 4A-4C, 5A-5C, and 6A-6C, on the other hand, extend the analysis of FIGS. 2A-2C to cases in which the scan pitch is selected to be approximately 0.75, 0.50 and 0.25 times the FWHM diameter of the scan spot, respectively. These cases demonstrate that the relationship between the intensity of the boundary scan 36 and the spatial positioning of the point at which the exposure profile 38 crosses the xerographic threshold 39 of the photoreceptor 14 becomes increasingly linear as the ratio of scan pitch to the FWHM diameter of the scan spot is reduce to progressively smaller, subunity values. Specifically, the boundary scan intensity/exposure boundary position relationship is linear to within: (1) about ±7% when the scan pitch is three quarters of the FWHM diameter of the scan spot (FIG. 4C), (2) about ±3% when the scan pitch is one half of the FWHM diameter (FIG. 5C), and (3) about ±1% when the scan pitch is one quarter of the FWHM diameter (FIG. 6C).

As previously pointed out, the overscanning that results from the use of these finer pitch scan patterns degrades the spatial frequency response of the printer 11 in the process direction. A limited overscan is, however, consistent with the printing of high quality images because it permits the image transitions (i.e., the high spatial frequency content of the images) to be mapped onto the scan pattern with increased spatial precision.

To capitalize on the ability of the printer 11 to move precisely position image transitions in the process direction, the multi-bit data values that are supplied by the data source 23 are modulated (by means not shown) so that each of the image transitions is represented by a data value that is substantially linearly proportional to the desired spatial offset (in predetermined sub-scan pitch units) of the transition from the nearest "macroaddressed" exposure boundary position (i.e., the spatial location at which the composite exposure profile 38 (FIGS. 4B, 5B and 6B) would cross the xerographic threshold 39 if the boundary scan 36 had a null or zero intensity level). This data modulation causes a corresponding intensity modulation of the laser beam 13, thereby permitting the spatial positioning of the exposure boundaries that define the image transitions (i.e., the locations at which the composite exposure profile 38 crosses the xerographic threshold 39) to be substantially linearly controlled to a precision, that is a submultiple of the scan pitch over a distance equal to the scan pitch. This is referred to herein as "microaddressability" to distinguish it from the coarser "macroaddressability" that is provided by full intensity scans.

In practice, the microaddressability of the printer 11 is largely dependent upon the granularity at which the data values for the boundary scans specify the desired exposure boundary offsets. For example, if three bit long data values are supplied, five of the eight available digital values suitably are used for controlling the positioning of the exposure boundaries in 25% increments over a span equal to the scan pitch (i.e., a positional granularity of one quarter of a scan pitch), from a "full left" or 0% offset position to a "full right" or 100% offset position (see FIG. 7). That effectively causes the process direction addressability of the printer 11 to be four times finer than the scan pitch because the data value for any given boundary scan can be selected to spatially offset the position of the corresponding exposure boundary (or, in other words, image transition) from the nearest macroaddressed boundary position by 0%, 25%, 50%, 75%, or 100% of the scan pitch.

If desired, the data values for the boundary scans may be precompensated (by means not shown) to compensate for any residual non-linearity of the addressability response (i.e., the boundary scan intensity/exposure boundary position relationship) of the printer 11 at the selected scan pitch. This precompensation provides the data values that are needed to cause the actual spatial positioning of the transitions to even more closely track the desired positioning (as shown, for example in FIG. 4C, the compensating intensity adjustment is given by the difference between the actual addressability response curve 41a and the linear approximation thereof 40b). Preferably, however, the need for this precompensation is avoided by using a scan pitch that is sufficiently fine to permit the positioning errors that are caused by this non-linearity to be ignored. For example, if the nominal positioning of the image transitions is controlled in 25% increments from a 0% offset position to a 100% offsetp position (see FIG. 7), adequate positioning precision usually can be achieved by selecting the scan pitch so that it is no greater than one half the FWHM diameter of the scan spot.

A variety of known techniques may be employed for reducing the scan pitch of a more or less conventional xerographic printer, such as printer 11 (FIG. 1). For instance, the angular velocity of the scanner 17 can be increased, the linear velocity at which the photoreceptor 14 is advanced can be decreased, and/or the number of scan spots that are used can be increased.

Figure 7A:
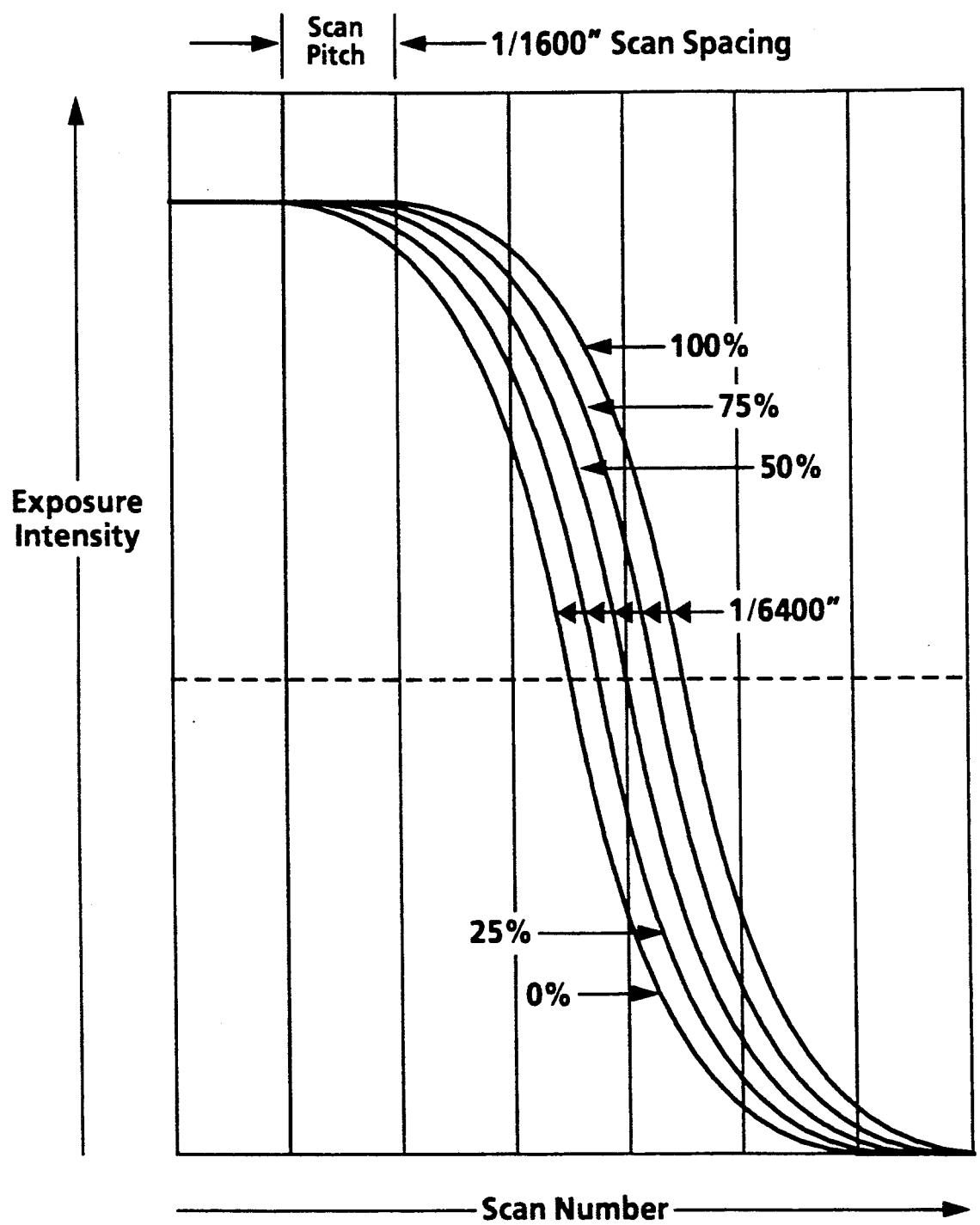
FIG. 7A illustrates the substantially linear, microaddressability that this invention provides for overscanned, ROS printers at at 2× overscan.

However, the favored approach for applying this invention to existing laser xerographic print engines is to employ additional scan spots because the number of scan spots generally can be increased without having to radically modify any of the electromechanical components of the print enging. Thus, FIG. 7A illustrates the nicroaddressability that can be built into a more or less conventional 400 d.p.i. laxer xerographic print engine by substituting a quadspot laser (i.e., a laser that supplies four independently modulable, paraller output beams)

for the single beam laser that is ordinarily used in such a print engine. This change reduces the scan pitch from 1/400" to 1/1600".

Figure 7B:
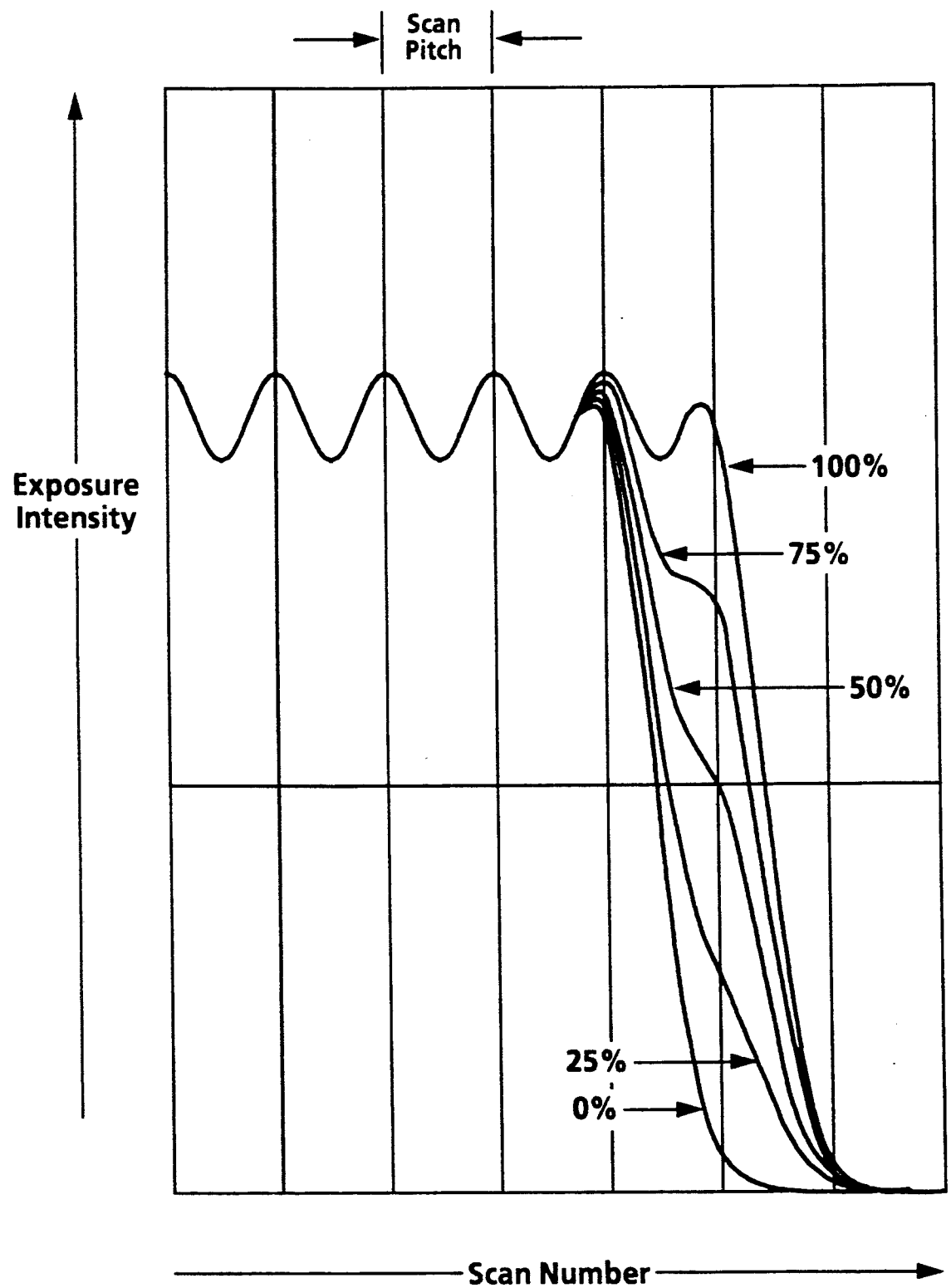
FIG. 7B illustrates the non-linearity of the addressability that such printers possess and the variable edge profiles they produce when they use conventional scan patterns.

In keeping with this invention, each of the four scan spots of such a quadspot printer suitably is selected to have a FWHM diameter of approximately 1/800" (i.e., twice the scan pitch) to provide a 2× overscan of the photoreceptor. Furthermore, the four parallel laser beams are independently modulated in accordance with respective streams of, say, three bit long data values, thereby providing sufficient microaddressability for spatially offsetting image transitions from the macroaddressable exposure boundaries by 0%, 25%, 50%, 75%, or 100% of the scan pitch, as previously described. As shown in FIG. 7A, a quadspot printer that conforms to the foregoing specifications is able to control the spatial positioning of the exposure boundaries/image transitions in the images that it prints to a precision of about 1/6400" in the process direction. Furthermore, the slope at which the composite exposure profile 38 crosses the xerographic threshold 39 in such a printer does not significantly vary as a function of the boundary scan intensity, so the microaddressability of the printer is substantially unaffected by the usual tendency of its xerographic threshold 39 to shift upwardly and downwardly by relatively small amounts as a function of the ambient operating conditions (i.e., temperature, humidity, etc.). To illustrate the contribution of the 2× overscan to the printer performance shown in FIG. 7A, FIG. 7B illustrates the comparable performance of a non-overscanned printer that uses, for example, a 1/800" scan spot and a scan pattern having a pitch of 1/800".

Figure 8:
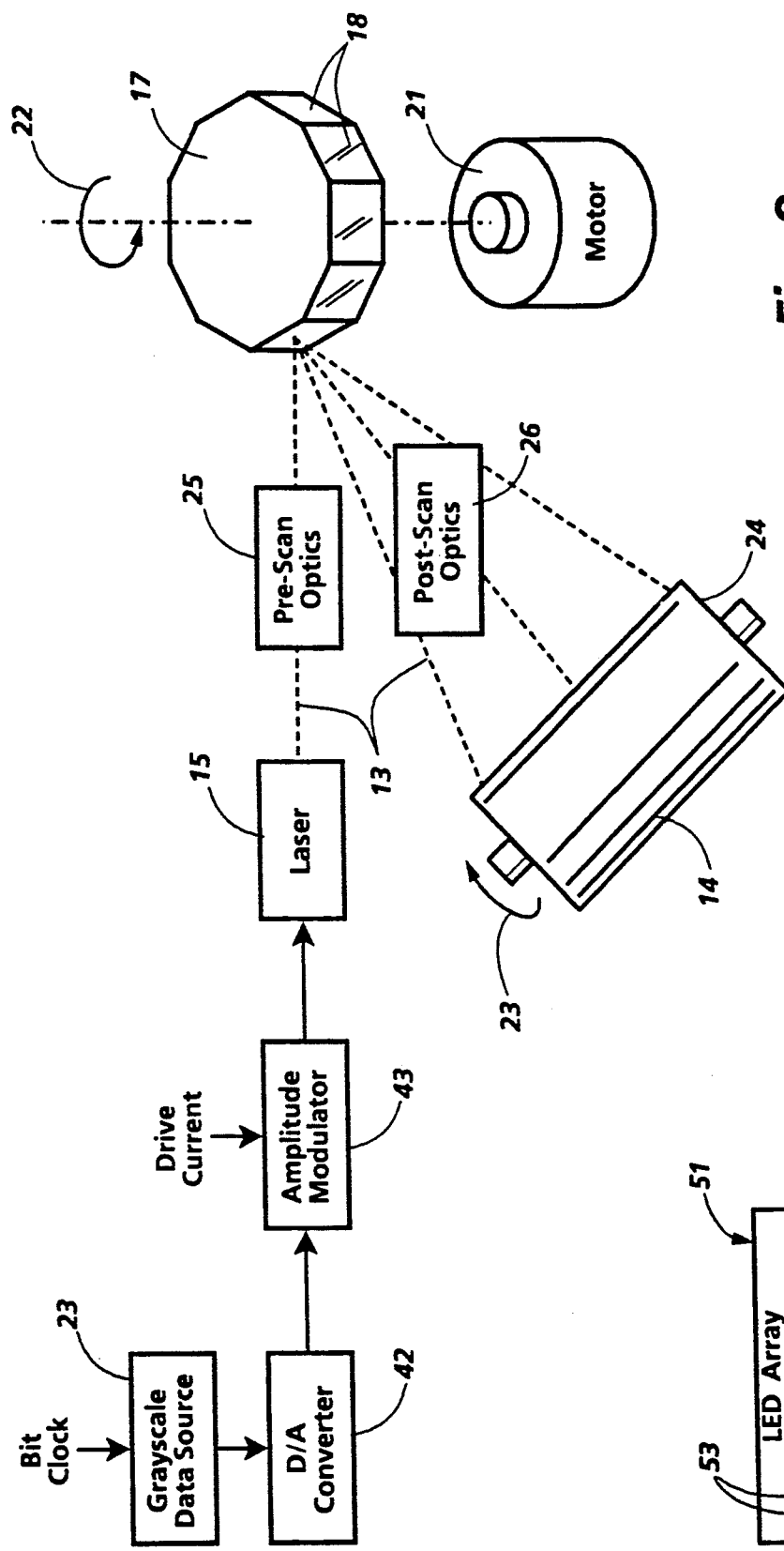
FIG. 8 illustrates an alternative boundary scan intensity modulation technique for printers of the type shown in FIG. 1.

Returning for a moment to the single beam/single scan spot embodiment of FIG. 1, it will be seen that the drive current for the laser diode 15 is serially modulated in accordance with the data values that are clocked out of the data source 23, thereby intensity modulating the laser beam 13 at the data clock rate in accordance with those data values. As more fully described in a copending and commonly assigned U.S. patent application of D. N. Curry, which was filed Jun. 28, 1990 under Ser. No. 07/545,744 on an "Arithmetic Technique for Variable Resolution Printing in a ROS" (D/90241), a digital duty cycle modulator 41 can be employed for driving the laser 13 with current pulses that are duty cycle modulated in accordance with such multi-bit data values. This has the advantage of being a strictly digital technique for intensity modulating the laser beam 13. Alternatively, however, a digital-to-analog (D/A) converter 42 (FIG. 8) could be employed for converting the multi-bit digital data values into corresponding analog signal levels. When this analog approach is used, the analog control signal that is provided by the D/A converter 42 is applied to an amplitude modulator 43 for amplitude modulating the drive current for the laser 15 (and, thus, the amplitude of the laser beam 13) in accordance with the data values.

Further applications of this invention will suggest themselves. As will be understood from the foregoing teachings, intensity modulated boundary exposures can be employed to provide substantially linear, sub-resolution control over the spatial positioning of image transitions in exposure profiles that are composed by printing multiple, superpositioned, discrete exposures on a high gamma, photosensitive recording medium, provided that the center-to-center spacing of the exposures is significantly less than the effective diameter of the footprint of the radiation to which the recording medium is exposed (i.e., the FWHM diameter of the incident print spot if the printing is performed by a gaussian spot).

Figure 9:
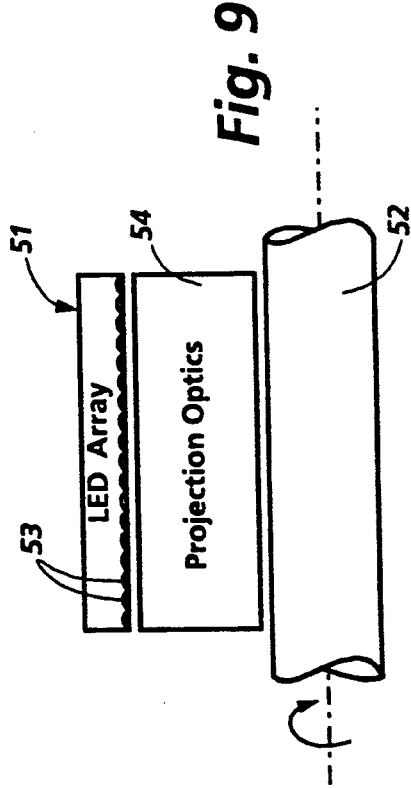
FIG. 9 schematically illustrates the use of the present invention for increasing the addressability of an optical image bar along an axis that is colinear with the individual pixel generators of the image bar.

This generalization means, for example, that the present invention can be applied to optical image bars, such as the LED image bar that is shown in FIG. 9 at 51, for increasing the transverse precision with which these image bars spatially position image transitions in images they print on high gamma recording media, such as the xerographic photoreceptor 52. More particularly, as shown in FIG. 9, the image bar 51 is composed of a linear array of individually addressable LED's 53 that are distributed widthwise of the photoreceptor 52 on generally uniformly spaced centers for sequentially exposing the photoreceptor 52 to successive lines of an image as the photoreceptor 52 is being advanced (by means not shown) in an orthogonal process direction. In this embodiment, the image bar 51 is projected onto the photoreceptor 52 by suitable projection optics 54, such as an array of SELFOC (self-focusing) lenses. Alternatively, however, it could be imaged onto the photoreceptor 52 at a predetermined magnification by imaging optics (not shown).

As will be appreciated, each of the line-like exposure profiles that the image bar 51 prints on the photoreceptor 52 is composed of multiple, superpositioned, discrete exposures that have contrast levels which vary in accordance with the output intensities of the respective LED's by which they were printed. Thus, to carry out this invention, the projection optics 54 (or the imaging optics) are designed to cause the center-to-center spacing of these superpositioned exposures to be substantially less than the effective diameter of the individual print spots that are produced by the LED's. This provides the microaddressability that enables the spatial positioning of the transitions in the images that the image bar 51 is printing to be controlled to a sub-resolution precision lengthwise of the array of LEDs 53 by intensity modulating the light beams that are emitted by the individual LEDs 53 to expose the photoreceptor 52 to appropriately modulated boundary scans.

CONCLUSION

In view of the foregoing, it now will be evident that the present invention provides relatively inexpensive and easily implemented methods and means for increasing the spatial addressability of printers and other optical display systems that render images on high gamma, photosensitive recording apparatus. These rendering systems are operated in an overscanned mode to provide the microaddressability that enables them to utilize intensity modulated boundary scans for substantially linearly controlling the spatial positioning of the transitions that are contained by the images they are rendering to a sub-resolution precision.

What is claimed:

1. A microaddressable display system for rendering bitmapped images on a high gamma, photosensitive recording medium: said display system comprising
scanner means for exposing said recording medium to at least one radiant scan spot in accordance with a scan pattern that causes said scanner means to superimpose mulitple discrete exposures on said recording medium, along at least one axis of said scan pattern, on centers that are separated by a substantially constant pitch distance; each scan spot being focused proximate said recording medium and having an effective spatial diameter that is substantially greater than said pitch distance, whereby said scanner means overscans said recording medium;

a source of grayscale data, said data being composed of sequences of high and low data values that are separated by respective boundary data values for rendering contrasting regions of an image that are spatially positioned to meet at respective transitions, with the boundary data values of said sequences being grayscale modulated in accordance with respective spatial offset values of preselected magnitude for specifying the spatial positioning of the respective transitions as a substantially linear function of the respective spatial offset values to a precision that is finer than said pitch, within a control range that is approximately equal to said pitch distance; and modulator means coupled between said data source and said scanner means for intensity modulating each scan spot in accordance with certain of said data values for rendering said image on said recording medium, such that said recording medium is exposed to intensity modulated boundary scans in response to said boundary data values to control the spatial positioning of said transitions to said precision.

2. The display system of claim 1 wherein said scanner is a ROS for exposing said recording medium to said at least one scan spot in accordance with a raster scan pattern having a predetermined scan pitch;

each scan spot has a substantially gaussian intensity profile and a FWHM diameter that is substantially greater than said scan pitch.

3. The display system of claim 2 wherein the FWHM diameter of each scan spot exceeds said scan pitch by a factor of at least approximately two.

4. The display system of claim 2 wherein said ROS includes a laser light source for supplying said at least one scan spot.

5. The display system of claim 4 wherein the FWHM diameter of each scan spot exceeds said scan pitch by a factor of at least approximately two.

6. The display system of claim 5 wherein
said laser light source is a laser diode; and
said modulator means drives said laser diode with current pulses that are width modulated in accordance with said data values.

7. The display system of claim 6 wherein said current pulses are periodic pulses having a duty cycle tht is modulated in accordance with said data values.

8. The display system of claim 5 wherein
said laser light source is a laser diode; and
said modulator means drives said laser diode with a current that is amplitude modulated in accordance with said data values.

9. The display system of claim 1 wherein said ROS includes a multi-beam laser diode light source for exposing said recording medium to a plurality of substantially parallel, independently modulable scan spots in accordance with said scan pattern, each of said scan spots having a gaussian intensity profile and a FWHM diameter that is substantially greater than said pitch distance.

10. The display system of claim 9 wherein the FWHM diameter of each of said scan spots exceeds said pitch distance by a factor of at least approximately two.

11. The display system of any of claims 1-10 wherein
said display system is a xerographic; and
said recording medium is a xerographic photoreceptor for xerographically printing renderings of said images.

12. The display system of claim 11 wherein said grayscale data is multi-bit digital data.

13. The display system of claim 11 wherein
said grayscale data is precompensated to compensate for residual non-linearity in said function.

* * * * *